(12) United States Patent
Farah et al.

(10) Patent No.: US 11,888,426 B2
(45) Date of Patent: Jan. 30, 2024

(54) METHOD OF CONTROLLING BRAKING OF AN MULTI-PHASE ELECTRICAL MOTOR

(71) Applicant: BORGWARNER LUXEMBOURG AUTOMOTIVE SYSTEMS SA, Bascharage (LU)

(72) Inventors: Philippe Farah, Bettanges-sur-Mess (LU); Sebastien Stoltz-Douchet, Basse-Ham (FR)

(73) Assignee: DELPHI AUTOMOTIVE SYSTEMS LUXEMBOURG SA, Bascharage (LU)

( * ) Notice: Subject to any disclaimer, the term of this patent is extended or adjusted under 35 U.S.C. 154(b) by 193 days.

(21) Appl. No.: 17/597,517

(22) PCT Filed: Jul. 3, 2020

(86) PCT No.: PCT/EP2020/068798
§ 371 (c)(1),
(2) Date: Jan. 10, 2022

(87) PCT Pub. No.: WO2021/018514
PCT Pub. Date: Feb. 4, 2021

(65) Prior Publication Data
US 2022/0255472 A1    Aug. 11, 2022

(30) Foreign Application Priority Data
Jul. 31, 2019  (GB) ..................................... 1910888

(51) Int. Cl.
*H02H 7/08*    (2006.01)
*H02P 3/12*    (2006.01)
(Continued)

(52) U.S. Cl.
CPC ................ *H02P 3/12* (2013.01); *B60L 7/003* (2013.01); *B60L 7/16* (2013.01); *B60L 15/2009* (2013.01); *H02P 3/22* (2013.01); *B60L 2220/58* (2013.01)

(58) Field of Classification Search
CPC .... H02P 3/12; H02P 3/22; H02P 27/06; B60L 7/003; B60L 7/16; B60L 15/2009; B60L 2220/58
See application file for complete search history.

(56) References Cited

U.S. PATENT DOCUMENTS

2017/0313193 A1    11/2017    Grossmann et al.

FOREIGN PATENT DOCUMENTS

| CN | 103813929 A | 5/2014 |
| CN | 104159779 A | 11/2014 |

(Continued)

OTHER PUBLICATIONS

GB Search Report dated Jan. 29, 2020 in British Application No. 1910888.5 (4 pages).

(Continued)

*Primary Examiner* — Karen Masih
(74) *Attorney, Agent, or Firm* — Joshua M. Haines; Bookoff McAndrews, PLLC (57) ABSTRACT

A method of braking for a vehicle with a multi-phase electric motor, said motor including at least one stator group including a first stator arrangement and a second stator arrangement, each arrangement including three coils, each arrangement connected to respective low side and/or high side circuitry, each low side and/or high side circuitry including respective low side switches and high side switches, said method including: for either of said second or first arrangements, i) setting any two of said switches in said low side circuitry to a closed state and the other switch in an open (Continued)

state, and setting all the switches in the high side to an open state; and/or ii) setting any two of said switches in said high side circuitry to a closed state and setting the other switch to an open state, and setting all the switches on the low side to an open state.

7 Claims, 5 Drawing Sheets

(51) Int. Cl.
*B60L 7/00* (2006.01)
*B60L 7/16* (2006.01)
*B60L 15/20* (2006.01)
*H02P 3/22* (2006.01)

(56) References Cited

FOREIGN PATENT DOCUMENTS

| CN | 104518709 | A | | 4/2015 | |
|----|-----------|---|---|--------|---|
| CN | 109383304 | A | | 2/2019 | |
| CN | 211786770 | U | * | 10/2020 | ............... G05B 9/03 |
| JP | 2006141110 | A | | 6/2006 | |
| JP | 2006288051 | A | | 10/2006 | |
| JP | 2007331683 | A | | 12/2007 | |
| JP | 2010047083 | A | | 3/2010 | |
| JP | 2013219868 | A | | 10/2013 | |
| JP | 2017213614 | A | | 12/2017 | |
| WO | 2015068827 | A1 | | 5/2015 | |
| WO | WO-2019065882 | A1 | * | 4/2019 | ............ B60L 3/0061 |

OTHER PUBLICATIONS

International Search Report dated Sep. 23, 2020 in International Application No. PCT/EP2020/068798 (5 pages).
Jeon K et al, "Development of a fail-safe control strategy based on evaluation scenarios for an FCEV electronic brake system", International Journal of Automotive Technology, the Korean Society of Automotive Engineers, Heidelberg, (Dec. 2, 2012), vol. 13, No. 7, doi:10.1007/S12239-012-0109-1, ISSN 1976-3832, pp. 1067-1075, XP035149270.
Listing of references cited in Notice of Allowance in Chinese Patent Application No. 202080055028.9, dated Jul. 20, 2023 (3 pages).

* cited by examiner

|  |  | Combination High side ASC | | | Combination Low side ASC | | |
|---|---|---|---|---|---|---|---|
|  | Switch | #1 | #2 | #3 | #4 | #5 | #6 |
| High side stator 1 | 31 | 1 | 1 | 0 | 0 | 0 | 0 |
|  | 33 | 1 | 0 | 1 | 0 | 0 | 0 |
|  | 35 | 0 | 1 | 1 | 0 | 0 | 0 |
| Low side stator 1 | 32 | 0 | 0 | 0 | 1 | 1 | 0 |
|  | 34 | 0 | 0 | 0 | 1 | 0 | 1 |
|  | 36 | 0 | 0 | 0 | 0 | 1 | 1 |
| High side stator 1* | 31* | 1 | 1 | 0 | 0 | 0 | 0 |
|  | 33* | 1 | 0 | 1 | 0 | 0 | 0 |
|  | 35* | 0 | 1 | 1 | 0 | 0 | 0 |
| Low side stator 1* | 32* | 0 | 0 | 0 | 1 | 1 | 0 |
|  | 34* | 0 | 0 | 0 | 1 | 0 | 1 |
|  | 36* | 0 | 0 | 0 | 0 | 1 | 1 |

1=closed  0=open

| | Switch | Combination High side ASC | | | Combination Low side ASC | | |
|---|---|---|---|---|---|---|---|
| | | #1 | #2 | #3 | #4 | #5 | #6 |
| High side stator 1 | 31 | 1 | 1 | 0 | 0 | 0 | 0 |
| | 33 | 1 | 0 | 1 | 0 | 0 | 0 |
| | 35 | 0 | 1 | 1 | 0 | 0 | 0 |
| Low side stator 1 | 32 | 0 | 0 | 0 | 1 | 1 | 0 |
| | 34 | 0 | 0 | 0 | 1 | 0 | 1 |
| | 36 | 0 | 0 | 0 | 0 | 1 | 1 |
| High side stator 1* | 31* | 1 | 1 | 0 | 0 | 0 | 0 |
| | 33* | 1 | 0 | 1 | 0 | 0 | 0 |
| | 35* | 0 | 1 | 1 | 0 | 0 | 0 |
| Low side stator 1* | 32* | 0 | 0 | 0 | 1 | 1 | 0 |
| | 34* | 0 | 0 | 0 | 1 | 0 | 1 |
| | 36* | 0 | 0 | 0 | 0 | 1 | 1 |

1=closed  0=open

X2

| | Switch | Combination High side ASC | | | Combination Low side ASC | | |
|---|---|---|---|---|---|---|---|
| | | #7 | #8 | #9 | #10 | #11 | #12 |
| High side stator 2 | 31 | 1 | 1 | 0 | 0 | 0 | 0 |
| | 33 | 1 | 0 | 1 | 0 | 0 | 0 |
| | 35 | 0 | 1 | 1 | 0 | 0 | 0 |
| Low side stator 2 | 32 | 0 | 0 | 0 | 1 | 1 | 0 |
| | 34 | 0 | 0 | 0 | 1 | 0 | 1 |
| | 36 | 0 | 0 | 0 | 0 | 1 | 1 |
| High side stator 2* | 31* | 1 | 1 | 0 | 0 | 0 | 0 |
| | 33* | 1 | 0 | 1 | 0 | 0 | 0 |
| | 35* | 0 | 1 | 1 | 0 | 0 | 0 |
| Low side stator 2* | 32* | 0 | 0 | 0 | 1 | 1 | 0 |
| | 34* | 0 | 0 | 0 | 1 | 0 | 1 |
| | 36* | 0 | 0 | 0 | 0 | 1 | 1 |

1=closed  0=open

METHOD OF CONTROLLING BRAKING OF AN MULTI-PHASE ELECTRICAL MOTOR

CROSS-REFERENCE TO RELATED APPLICATION(S)

This application is a U.S. National Stage Application under 35 U.S.C. § 371 of International Application No. PCT/EP2020/068798, filed Jul. 3, 2020, which claims priority to GB Application No. 1910888.5, filed Jul. 31, 2019, the entireties of which are incorporated herein by reference.

TECHNICAL FIELD

This invention relates to vehicles which include electrical drives systems including an electric motor. It relates to a method of controlled braking of such electric motor and has particular application to 6-phase motors.

BACKGROUND OF THE INVENTION

In a default mode (fail safe) mode in an electric or hybrid vehicle, the inverters of the electrical motor system are controlled to provide an Active Short Circuit (ASC). The goal is to protect the freewheeling diodes of the gates of the invertor circuit against over-currents. This ASC mode however generates braking torque on e-machines (electric motors) due to induced currents. This unwanted braking torque can be significantly high and may violates the ISO262262 standard regarding unintended decelerations of a vehicle. It is an object of the invention to reduce and eliminate such possibilities.

In a default mode (fail safe) for electric vehicles (EV) or hybrid vehicles (HEV) vehicles equipped with an e.g. 6 phase electric motor (machine) inverters are commanded into an Active Short Circuit. An issue is that PM Machine exhibits back EMF (even when not commanded). At high speed, back EMF which exceeds DC Bus Voltage will generate current flow through the diodes of the circuitry and charge the battery (even without commanding the appropriate switches).

A solution to this is to provide the Active Short Circuit.

SUMMARY OF THE INVENTION

In one aspect is provided a method of braking in an electrically powered vehicle, said vehicle including a drive system which includes a multi-phase motor electric motor, said motor comprising at least one stator group; said stator group comprising a first stator arrangement including three coils (e2, e4, e6) and a second stator arrangement including threes coils, (e2* e4* e6*) being angularly offset from said first coil arrangement, and where, said first arrangement is connected to respective low side and/or high side circuitry, including a low side switches (32, 34, 36) and/or high side switches (31, 33, 35) for each of the said coils respectively, adapted to selectively allow current to flow through said respective coils of said first stator arrangement from a power source, and where said second arrangements is connected to respective low side and/or high side circuitry, including a low side switches (32*, 34, *36*) and/or high side switches (31*, 33*, 35*) for each of the said coils respectively, adapted to selectively allow current to flow through said respective coils of said second stator arrangement from a power source, said method comprising: for one or more of each group:

for either or both of said second or first arrangements, i) setting any two of said switches in said low side circuitry to a closed state and the other switch in an open state, and setting all the switches in the high side to an open state; and/or ii) setting any two of said switches in said high side circuitry to a closed state and setting the other stich to an open state, and setting all the switches on the low side to an open state.

Said motor may be a star connected machine including, for each stator group, a first node N providing a common connection point of respective terminals of the coils e2 e4 and e6 of the first arrangement and a second node N* providing a common connection point of respective terminals of coils e2* e4* and e6* of said second arrangement and including a node switch between said nodes, wherein during braking the node switch is closed.

Said motor may be a 6-phase motor with one stator group including two coil arrangements, each comprising three coils, said arrangements being offset from each other.

Said motor may be a 12-phase motor with two stator groups, and each stator group including two coil arrangements, each comprising three coils, said arrangements being offset from each other.

BRIEF DESCRIPTION OF THE DRAWINGS

The present invention is now described by way of example with reference to the accompanying drawings in which.

DESCRIPTION OF THE PREFERRED EMBODIMENTS

Electric vehicles are known which use, for example, 3-phase electric motors.

Figure 1:
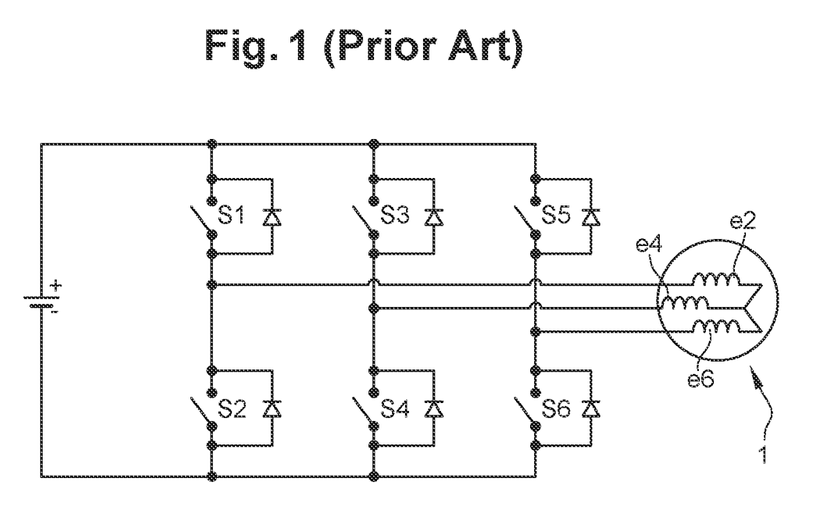
FIG. 1 shows a schematic diagram of the known 3-phase electric motor system.

FIG. 1 shows a schematic diagram of the known 3-phase electric motor system used in vehicle applications along with the associated circuitry to control the motor. A 3-phase motor, is shown by the stator coil arrangement comprising three coils e2, e4, and e6 is controlled by appropriate switching of six switches in the arrangement as shown. The switches are S1, S2, S3, S4, S5 and S6. Switches S1, S3 and S5 are high side switches selectable to control current from the supply through stator coils e2, e4, e6 respectively. Respective low side switches are S2, S4 and S6.

In a 3 phase machine control with braking torque, Active Short Circuit mode is provided by closing the switches S2, S4, S6 (low side) together while keeping the others open. Alternatively switches S1, S3 and S5 are closed and the other switches are kept open. This puts the three phases of the e-machine (3-phase motor here) in short circuit. As a consequence, currents will be induced into the phases that will create undesirable braking torque causing a violation of conditions set in ISO262262.

Figure 2:
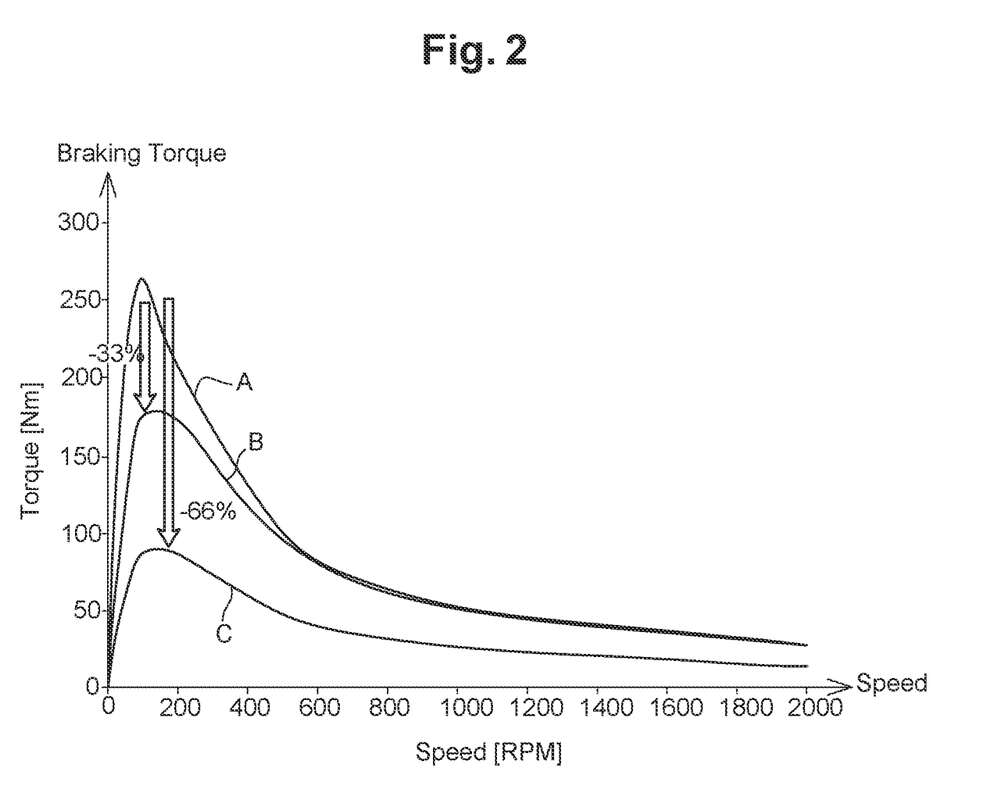
FIG. 2 shows plot of torque produced against engine speed for prior art systems and systems according to examples of the invention.

FIG. 2 shows plot A of torque produced against engine speed in this case.

Invention

As mentioned above, the state of the art is to use a conventional 3-phase controller and short either the 3 high side gates or the 3 low side gates (equivalent to a 6 phases 6ASC).

In aspects of the invention a 6-phase or 12-phase machine is used as an electrical motor in a system in a vehicle, adapted to provide reduced braking torque. Thus examples provide methodology and hardware to reduce braking torque in ASC mode According to one aspect a 6-phase machine (motor) and controller arrangement (comprising two 3-phases controllers) is used in a vehicle and in braking mode/ASC mode, two phases per controller are shorted.

Figure 3:
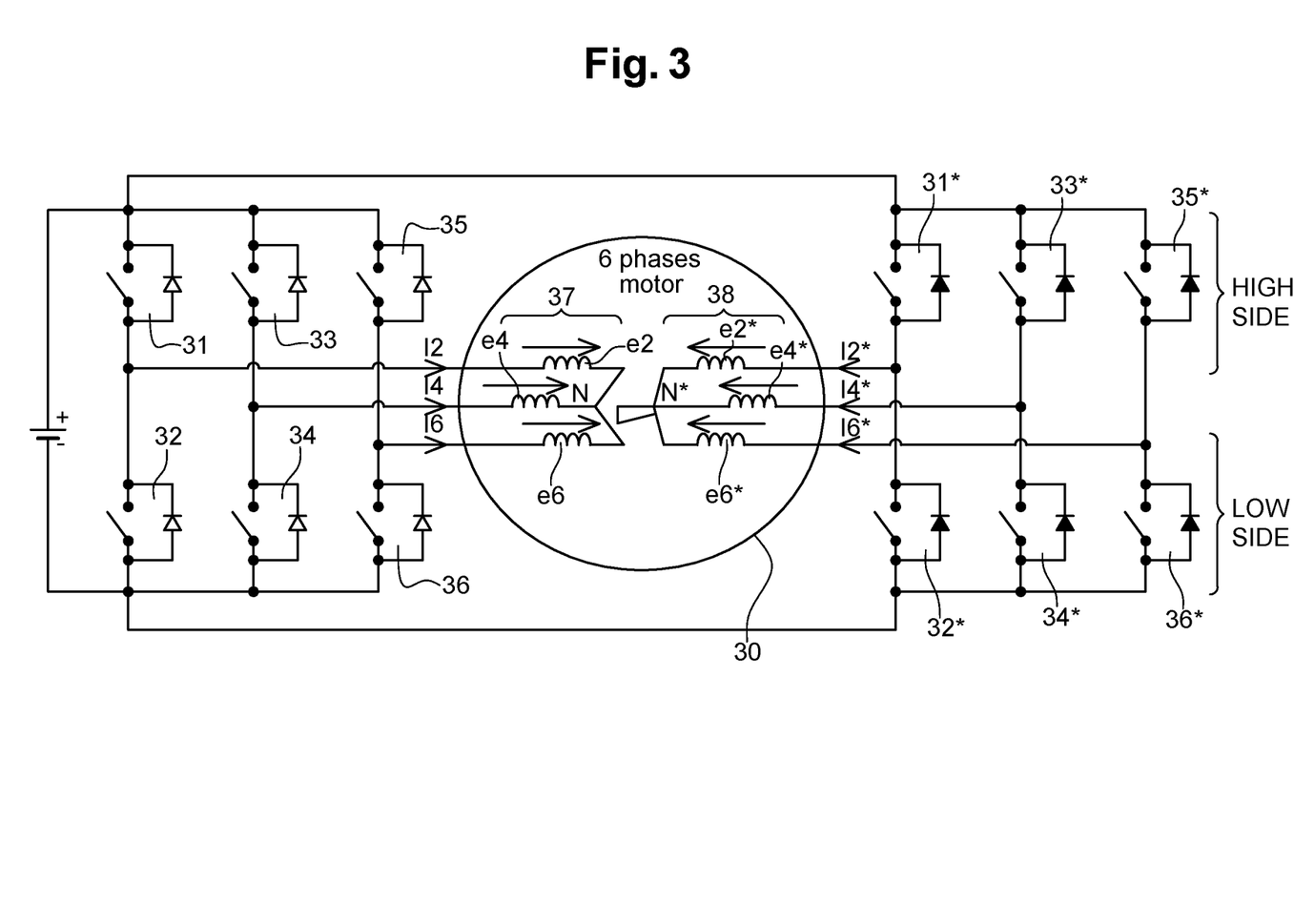
FIG. 3 shows a 6-phase motor with associated controlling circuitry.

In a 6-phase machine, there are two stator arrangements, each comprising three coils. One coil of each arrangement is offset to a corresponding coil on the other arrangement by a set (offset) angle. In such angular offset arrangement, the corresponding coils (the phase) are preferably selected to be 90 electrical degrees shifted between the two controllers (to reduce torque ripple). Such motors may have star connected or delta connected arrangements and aspects of the invention are applicable to both FIG. 3 shows a 6-phase motor with associated controlling circuitry. The 6 phase electrical motor includes two stator arrangements 37 and 38, each comprising three coils. The first arrangement includes coils e2, e4, and e6 and the second arrangement corresponding respective coils e2*, e4*and e6*, which are offset by an angle α (e.g. 90°) to coils e2, e4, and e6 respectively. Current to the respective coils e2, e4, e6 is controlled by switches 31, 33 and 35 respectively on the high side and/or switches 32, 34 and 36 respectively on the low side.

So the control for the electric 6-phase motor is via a first low side half bridge (switches) and/or second low side half bridge (switches) for coil arrangement 37 and another first high side half bridge and/or second high side half bridge for coil arrangement 38.

Figure 4A:
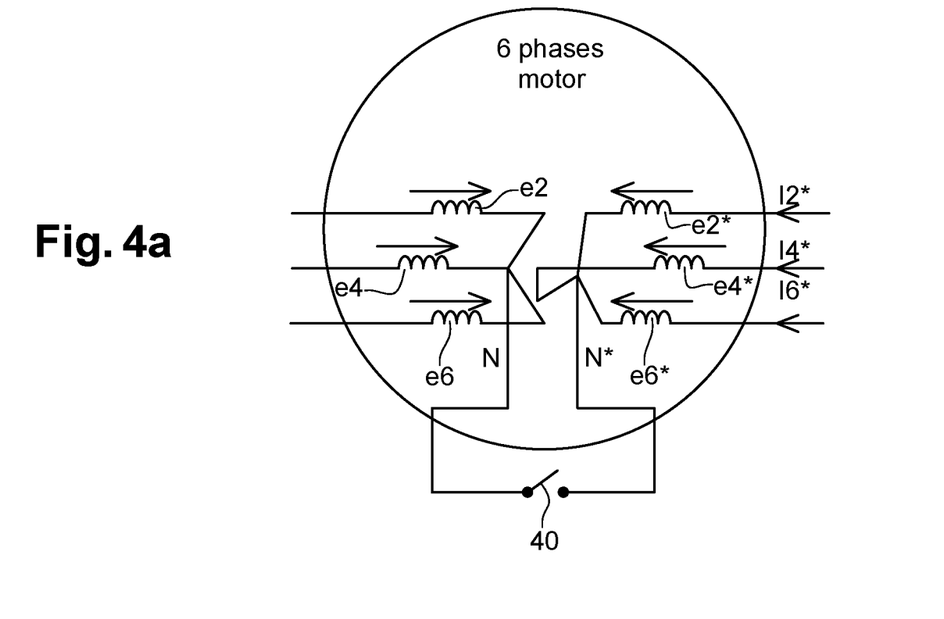
FIG. 4a shows a circuit arrangement of the stator coils in a 6-phase machine according to one further embodiment.
Figure 4B:
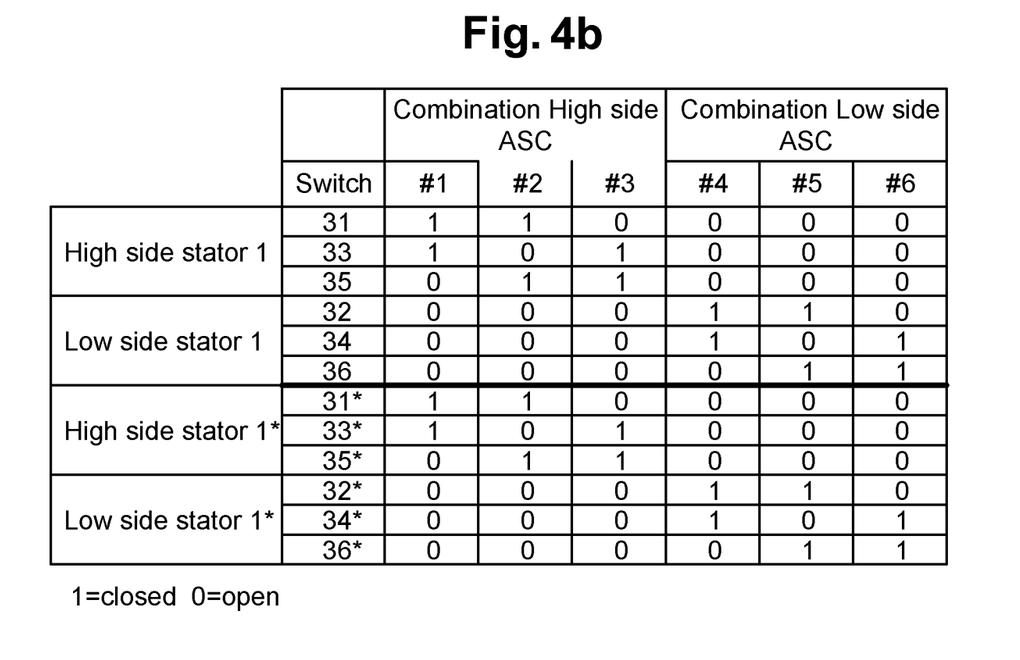
FIG. 4b shows an example table of braking provided by closing the combinations of switches as shown.

As mentioned according to methodology of the invention, two phases per controller or per coil are shorted. So in aspects of the braking is provided by closing the following combinations of switches:

a) i) Any two of switches 31, 33, 35, closed; the other switches 32, 34, 36 open. These combinations are shown in the table of FIG. 4a above the bold line in columns #1 to #3.
   ii) Preferably in this instance the switches 31* 33* 35* are in the same state as the corresponding switches 31, 33, and 35 respectively and switches 32, 34, 36 are all open. These combinations are shown above and below the bold line in the columns #1 to #3 of the table of FIG. 4b.
b) i) Any two of switches 31*, 33*, 35*, closed; the other switches 32*, 34*, 36* open. These combinations are shown in the table below the bold line.
   ii) Preferably in this instance the switches 31 33 35 are in the same state as the corresponding switches 31*, 33*, and 35* respectively and switches 32, 34, 36 are all open. These combinations are shown in the columns #1 to #3; so the same combinations as a) ii) above.

c) i) Any two of switches 32, 34, 36, closed; the other switches 31, 33, 35 open. These combinations are shown in the table above the bold line in columns #4, #5, #6.
   ii) Preferably in this instance the switches 32* 34* 36* are in the same state as the corresponding switches 32, 34, and 36 respectively and switches 31, 33, 35 are all closed. These combinations are shown above and below the bold line columns #4 to #6.
d) i) Any two of switches 32*, 34*, 36*, closed; the other switches 31*, 33*, 35* open. These combinations are shown in the table below the bold line in columns #4 to #6.
   ii) Preferably in this instance the switches 32, 34, 36 are in the same state as the corresponding switches 32*, 34*, and 36* respectively and switches 31, 33, 35 are all closed. These combinations are shown in the columns #4 to #6; so the same combinations as c) ii) above.

In summary therefore in examples, any two of switches 32, 34, 36 closed and any two of the respective switches 32*, 34*, 36* closed (respecting the 90° shift condition) the other open. That is to say for high side drive ASC, the combinations allowed are from #1 to #3 and low side drive ASC from #4 to #6 in the table of FIG. 4b.

So to recap is provided a method of braking in an electrically powered vehicle, said vehicle including a drive system which includes a 6 phase motor electric motor, said motor comprising at least one stator group; said stator group comprising a first stator arrangement including three coils (e2, e4, e6) and a second stator arrangement including threes coils, (e2* e4* e6*) being angularly offset from said first coil arrangement, and where, said first arrangement is connected to respective low side and/or high side circuitry, including a low side switches (32, 34, 36) and/or high side switches (31, 33, 35) for each of the said coils respectively, adapted to selectively allow current to flow through said respective coils of said first stator arrangement from a power source, and where said second arrangements is connected to respective low side and/or high side circuitry, including a low side switches (32*, 34, *36*) and/or high side switches (31*, 33*, 35*) for each of the said coils respectively, adapted to selectively allow current to flow through said respective coils of said second stator arrangement from a power source, said method comprising: for one or more of each group: for either or both of said second or first arrangement, setting any two of said switches in said low side circuitry to a closed state and the other switch in an open state, and setting all the switches in the high side to an open state; and/or setting any two of said switches in said high side circuitry to a closed state and setting the other stich to an open state, and setting all the switches on the low side to an open state.

Returning to FIG. 2, plot B shows the reduction in breaking torque of up to 33% obtained by using the above 6 phase machine and the breaking technique described above.

FIG. 4a shows a circuit arrangement of the stator coils in a 6-phase machine according to one further embodiment. The arrangement is identical to arrangement 30 with identical reference numerals referring to the same components. The machine has a star arrangement as shown, including a first node N providing a common connection point of respective terminals of coils e2 e4 and e6 and a second node N* providing a common connection point of respective terminals of coils e2* e4* and e6*. However, there is provided an additional switch 40 connected between the first stator (coil arrangement) and the second stator (coil arrangement) via the nodes i.e. there is an extra switch between node N and N*. Here the switch is connected between the common connection point of coils e2 e4 and e6, and common connection point of coils e2* e4* e6

In methodology, when breaking, switch 40 is closed. In addition, or optionally, the switches 31 to 36, and 31* to 36* are set to the state in the cases a) b) c) or d) above. By adding the additional switch (link the neutrals), the braking torque can even be reduced further up to 66% (6 phases 2ASC) compared to plot A. This 6 phases architecture is relevant especially for high current applications where multiple gates are already used in parallel.

Returning to FIG. 2 plot C shows the further reduction in braking torque when the additional switch between the neutral is added. The braking torque can be significantly reduced further as shown.

Figure 5:
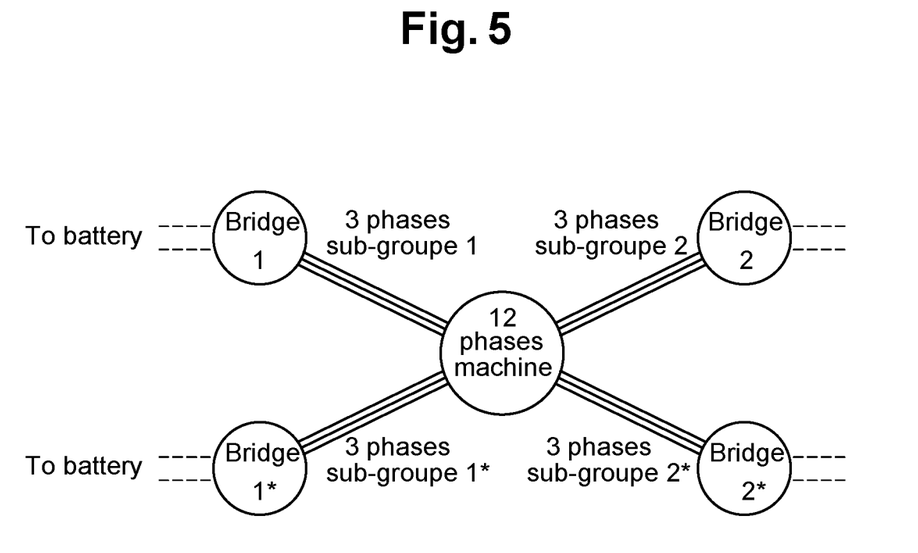
FIG. 5 shows a diagrammatic representation of a 12-phase machine with associated control circuitry.

So to recap said 6-phase motor may be a star connected machine including a including a first node N providing a common connection point of respective terminals of the coils e2 e4 and e6 of the first arrangement and a second node N* providing a common connection point of respective terminals of coils e2* e4* and e6* of said second arrangement and including a node switch between said nodes, wherein during braking the node switch is closed 12 Phase Aspects are also applicable to 12 phase machines. FIG. 5 shows a diagrammatic representation of a 12-phase machine 100 with associated control circuitry. The 12 phase machine is essential a doubled up version of a 6-phase machine and has The 12 phase machine 100 may be considered as comprising two groups of stators (arrangements) stator #1 and stator #2; in a first group, with respect to stator #1, there are two stator coil arrangements (Sa1 and Sa1*) each comprising three coils/winding (e.g. in a delta/star arrangement) offset to one another e.g. by 90 degrees; in a second group, stator #2, there are also two stator coil arrangements (Sa2 and Sa2*) each comprising three coils/winding (e.g. in a delta/star arrangement) offset to one another e.g. by 90 degrees. The first group and second group may be offset to each other in symmetrical fashion as described above.

So the 12 phases system may be made up of 12 phases machines with 90° electrical between all group of phases: 90° electrical between phases stator arrangement/sub-group 1 and 1*; 90° electrical between phases of stator arrangement/sub-group 1* and 2; 90° electrical between phases of stator arrangement/sub-group 2 and 2*; 90° electrical between phases of stator arrangement/sub-group 2* and 1.

In the figure each group has two bridges for each sub-group stator arrangements. Thus reference numerals 101 102 103 and 104 designated the bridges for bridge in relation to stator arrangements Sa 1, Sa 1*, Sa2, Sa2* respectively. Each bridge has 3-switches in both the high side and low sides; for correspondingly each of the three coils in the winding/stator arrangement.

FIG. 5 can thus be considered as comprising two lots of identical circuitry shown in FIG. 3, one for each of the stator group.

According to examples the ASC/braking principle is the same as the 6 phases that we apply 2 times (sub-group 1 and 1* and/or sub-group 2 and 2*). This provides the same braking torque improvement as the 6 phases In other words the regime(s) described above with reference to the 6 phase machine is applied to either or both of the stator group of a 12-phase machine.

Figure 6:
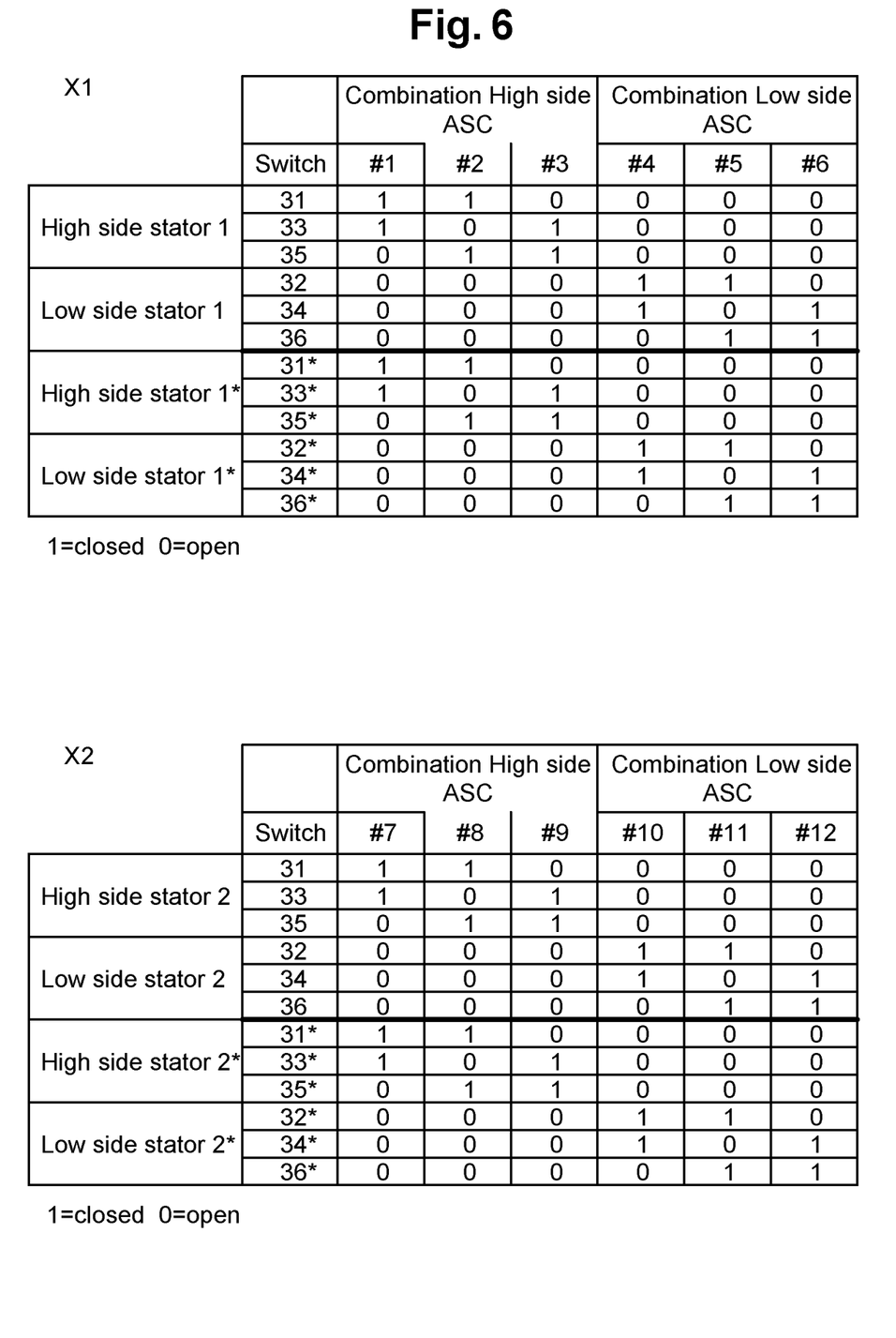
FIG. 6 shows two tables showing the switching logic for a 12-phase machine.

FIG. 6 shows two tables showing the switching logic for a 12-phase machine and shows two X1 and X2 for each stator group #1 and #2 respectively.

For the first stator group #1 the table shows the High and low side Stator subgroups designated as "high side stator 1" and "low side stator 1" for the first stator subgroup; and the "high side stator 1*" and "low side stator 1*" for the second subgroup.

For the second stator group #1 the table shows the High and low side Stator subgroups designated as "high side stator 2" and "low side stator 2" for the first stator subgroup; and the "high side stator 2*" and "low side stator 2*" for the second subgroup.

Again each stator group would have low side switches 31, 33, 35 for the first subgroup, high side switches 32, 34, 36, for the first subgroup and low side switches 31* 33* 35* for the second sub-group and high side switches 32* 34* and 36* for the second subgroup, the subgroups (for each main group) being offset to each other.

The table shows the state of the switches when braking.

For 12 phases, with respect to using these machine in a vehicle, for braking, valid combinations of switch settings can be any shown in the column #1 to #6 with shown in table X1 with respect to the first stator group and/or any combination from shown in the columns #7 to #12 of table X2 with respect to the second stator group.

Essentially any or both of the stator groups may be controlled similar to the single group in a 6 phase machine; that is for one or both of the coil arrangements of the group 2 switches close the other open on either low side or high side; the corresponding switches open on the appropriate other low/high side.

Aspects of the invention are especially applicable to commercial vehicle Electrified applications, and are especially relevant for high power application i.e. where Pmax/Vdc exceeds ~250 kW/320V)

The invention claimed is:

1. A method of braking in an electrically powered vehicle, said vehicle including a drive system which includes a multi-phase electric motor, said motor comprising at least one stator group; said stator group comprising a first stator arrangement including three coils in a first coil arrangement and a second stator arrangement including three coils in a second coil arrangement, said second coil arrangement being angularly offset from said first coil arrangement, and where, said first stator arrangement is connected to respective low side and/or high side circuitry, including low side switches and/or high side switches for each of the said coils respectively, adapted to selectively allow current to flow through said respective coils of said first stator arrangement from a DC power source, and where said second stator arrangement is connected to respective low side and/or high side circuitry, including a low side switches and/or high side switches for each of the said coils respectively, adapted to selectively allow current to flow through said respective coils of said second stator arrangement from a DC power source, said method comprising: for one or more of each group:

for both of said second or first stator arrangements, i) setting any two of said switches in said low side circuitry to a closed state and the other switch in an open state, and setting all the switches in the high side to an open state; and/or ii) setting any two of said switches in said high side circuitry to a closed state and setting the other switch to an open state, and setting all the switches on the low side to an open state.

2. A method as claimed in claim 1 wherein said motor is a star connected machine including, for each stator group, a first node N providing a common connection point of respective terminals of the coils of the first arrangement and a second node N* providing a common connection point of respective terminals of coils of said second arrangement and including a node switch between said nodes, wherein during braking the node switch is closed.

3. A method as claimed in claim 1 wherein said motor is a 6-phase motor with one stator group including two coil arrangements, each comprising three coils, said arrangements being offset from each other.

4. A method as claimed in claim 1 wherein said motor is a 12-phase motor with two stator groups, and each stator group including two coil arrangements, each comprising three coils, said arrangements being offset from each other.

5. The method as claimed in claim 1, wherein said motor is a delta connected machine.

6. The method as claimed in claim 1, wherein the angle of angular offset is 90 degrees.

7. The method as claimed in claim 1, wherein the DC power source exceeds approximately 250 kw and/or 320V.

* * * * *